May 21, 1929.  A. G. SCHLICHER  1,713,923
AUTO TRUCK COVER
Filed Feb. 21, 1928  2 Sheets-Sheet 1

Inventor
Arthur G. Schlicher

By Mason Fenwick Lawrence
Attorneys

May 21, 1929.  A. G. SCHLICHER  1,713,923
AUTO TRUCK COVER
Filed Feb. 21, 1928   2 Sheets-Sheet 2
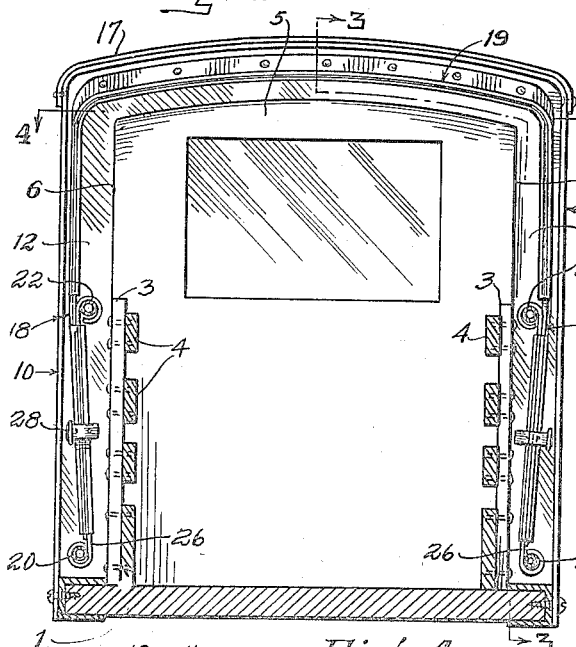
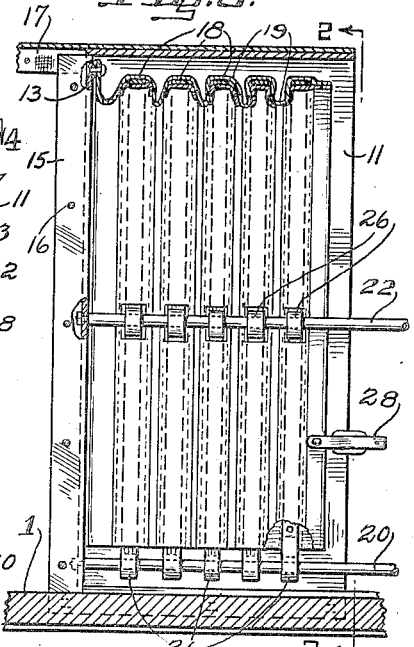
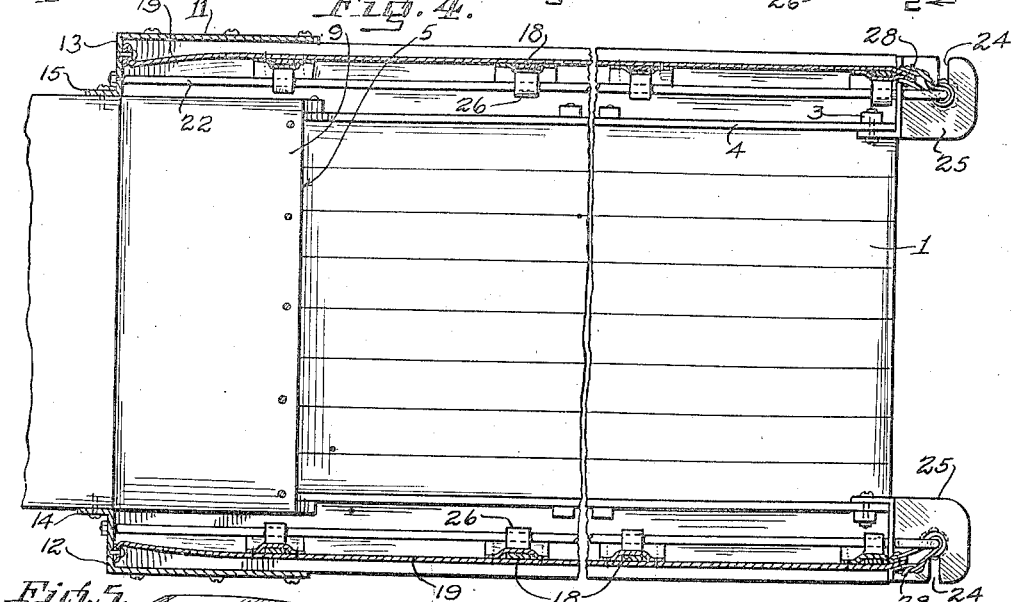
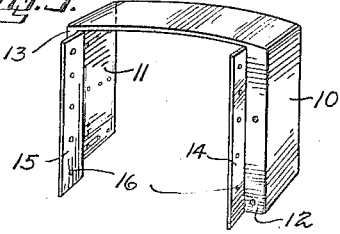
Inventor
Arthur G. Schlicher
By Mason Fenwick & Lawrence
Attorneys Patented May 21, 1929.

1,713,923

UNITED STATES PATENT OFFICE.

ARTHUR GROVER SCHLICHER, OF ALLENTOWN, PENNSYLVANIA.

AUTO-TRUCK COVER.

Application filed February 21, 1928. Serial No. 255,983.

This invention relates to collapsible covers adapted to be readily connected to motor vehicles, motor trucks, cars, etc.

The main object of the invention is to provide a cover adapted to be secured to existing motor trucks without necessitating alteration in the bodies of such trucks to receive the cover.

Another object of the invention is to provide a flexible cover for a vehicle connected to inverted U-shaped uprights slidable along the body of the truck to form a collapsible support for the cover.

A further object of the invention is to provide a casing at the cab end of the truck, to form with the cab body a recess, into which the uprights may be slid, to form a housing for the collapsed cover.

Other objects of the invention will become apparent as the detailed description thereof proceeds.

In the drawings:—

Figure 2 is a vertical transverse section taken on line 2—2 of Figure 3 of my cover, collapsed in its recess;

Figure 3 is a longitudinal section taken on the line 3—3 of Figure 2;

Fig. 4 is a horizontal section taken on the line 4—4 of Fig. 2.

Figure 5 is a perspective view of the cover casing forming part of this invention.

Figure 1:
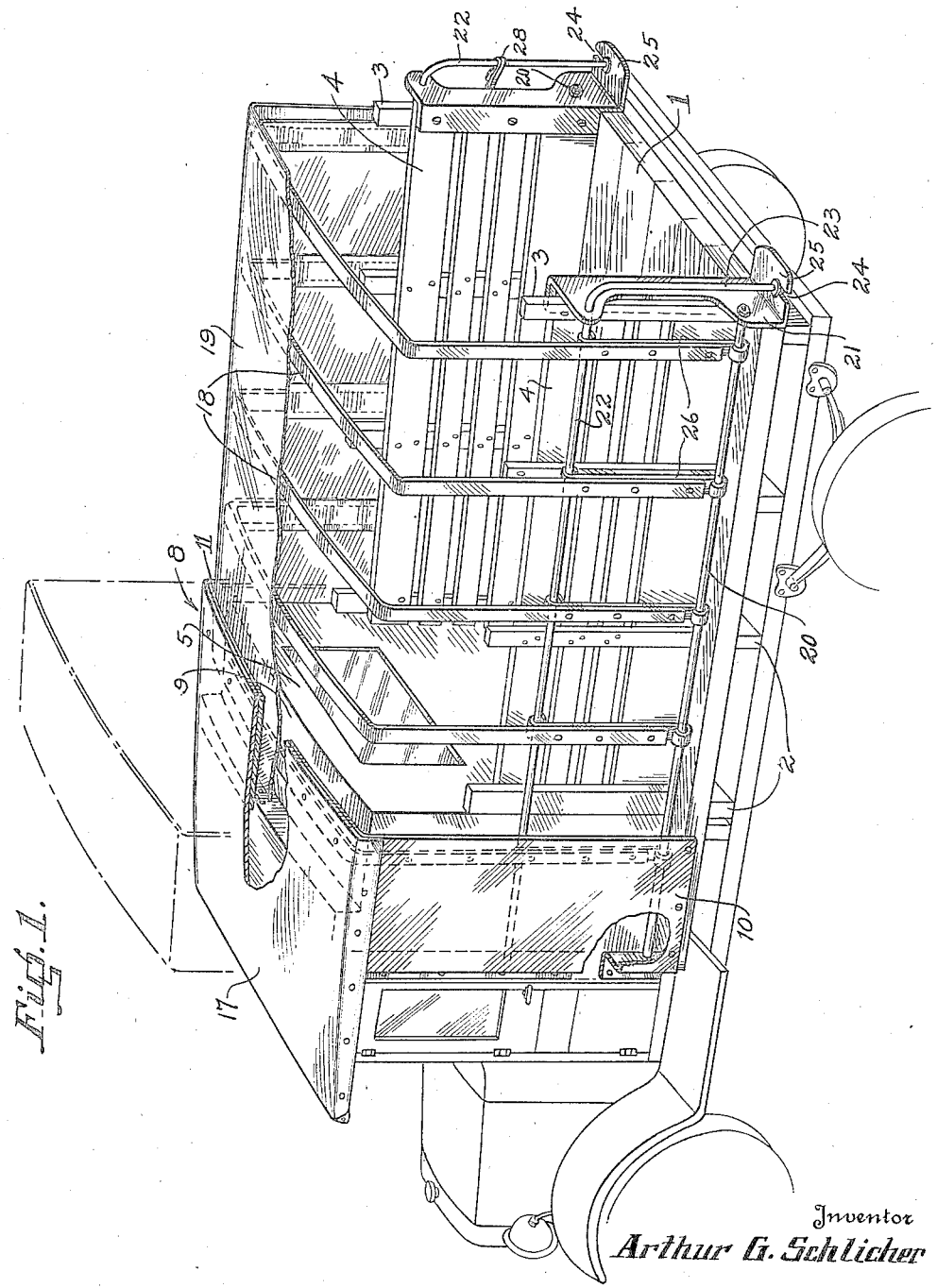
Figure 1 is a perspective view of the invention as applied to a motor truck, with the part of the canvas or other flexible cover removed to show the details of construction.

In the drawings. The numeral 1 designates the floor of the truck body supported on cross rails 2, suitably attached to the chassis of the truck. Standards 3 are secured perpendicularly to the floor 1, and have boards or plates 4 secured thereto to form the walls of the truck body. The front standards are suitably secured to the back 5 of the truck cab and have their outer faces flush with the sides 6 and 7 of the cab which, as usual, is suitably secured to the truck body and to the chassis.

The matter so far described is standard and constitutes no part of the present invention, which, as previously stated, is intended as an attachment for standard trucks.

The attachment comprises a casing 8 shaped to fit over the truck cab and to form a recess with the sides 6 and 7 and the top 9 of the cab. The casing 8 includes sides 10 and 11 having end walls 12 and 13, extending inwardly toward each other and bent to form flanges 14 and 15 adapted to fit snugly against the sides 6 and 7, respectively, of the cab. The flanges 14 and 15 are provided with suitable apertures 16, adapted to receive any suitable fastening means for securing the casing 8 to the cab.

The top 17 of the attachment is also spaced from the top 9 of the cab to form with the spaces between the sides 6, 10, 7 and 11 an inverted U-shaped space, designed to receive the correspondingly shaped bars 18 which support the flexible cover 19.

In order to provide slidable supports for the bars 18, each side of the attachment has a longitudinally arranged bar 20 secured at one end, to the end wall 12 or 13, as the case may be, and has its other end bolted, or otherwise secured to an end plate 21, which in turn, is adapted to be bolted to the ends of boards 4 and uprights 3 at the rear end of the truck body.

A second L-shaped rod has one branch 22 thereof arranged above and parallel to the rod 20, and the end of this branch is bolted or otherwise secured to end wall 12 or 13, as the case may be. The other branch 23 of the upper rod is turned down to enter a slot 24 formed in a flange 25 extending laterally out from the lower end of plate 21. The lower end of branch 23 is screw threaded to receive suitable adjusting and lock nuts on opposite sides of flange 25 for locking the branch 23 securely to the flange. This downturned branch 23 forms a convenient hand rail to enable the truck driver to climb into the truck; it also forms a very convenient means to which ropes may be secured for holding the contents of the truck in place, or to receive a cross bar for locking a pivoted end wall or door in place.

Slidable on rod 20 and branch 22 are a plurality of slides 26 having their ends looped to embrace the rod and branch loosely. It will be understood that suitable roller bearings may be substituted for these loops, and that the loop form is shown merely for convenience of illustration and description. It will also be understood that the rod and slide construction is identical on both sides of the truck, the same reference numerals being used herein to designate similar parts on both sides of the truck.

The inverted U-shaped bars 18 have the ends of their parallel legs suitably secured to the slides 26. A flexible cover 27 of canvas, or other suitable material is secured to these bars 18 with the bars 18 suitably spaced apart to ensure the outer end bar being positioned against the end of the plates 21, when the cover is fully opened and while the inner end cover is held fixed against the inner end walls 12 and 13 in the cover receiving recess.

The cover receiving recess is deep enough to receive all the bars 18 and the cover 17 when the cover is collapsed; and any suitable means may be provided to lock the collapsed cover in its recess. Straps 28 may be secured to the opposite legs of the outer bar to engage the rod branches 23, when the cover is expanded, to hold the cover taut in expanded position.

It will be apparent that I have provided a collapsible cover attachment which can be designed to fit any particular standard make of truck or car, and which can be very quickly attached to the standard truck body without necessitating anything more than the boring of a few holes to receive retaining bolts. The cover receiving recess prevents deterioration of the cover by exposure to the weather, and by protecting it from injury inevitable whenever the cover would be exposed to the careless abuse of the drivers.

Having thus described my invention, what I claim as new and desire to secure by Letters Patent is:—

1. The combination with a truck body having a driver's cab, of a casing detachably secured to said cab and spaced laterally from the sides and from the top thereof to form a recess, and a collapsible cover secured at one end to said casing and adapted to be received wholly within said casing and over the top of said cab when collapsed and to extend to the rear end of the truck when extended.

2. The combination with a truck body having a driver's cab, of a casing having end walls detachably secured to said cab to hold the casing spaced from the sides and top of said cab to form a recess, a plurality of slide rods having one end of each fixed to said end walls, a plate adjustably secured to the other ends of said rods and adapted to be detachably secured to the rear end of the truck body, and a collapsible cover slidable on said rods into and out of collapsed position in said recess.

3. The combination with a truck body having a driver's cab, of a casing having end walls detachably secured to said cab to hold the casing spaced from the sides and top of the cab to form an inverted U-shaped recess, a plurality of guide rods on each side of the cab parallel to each other and having one end of each fixed to said end walls on opposite sides of the cab, a plate adjustably secured to the other end of said rods and secured to the rear end of the truck body, a plurality of inverted U-shaped bars having their legs mounted on said guide rods to slide into and out of said recess, and a flexible cover secured to said bars.

4. The combination with a truck body having a driver's cab, of a casing detachably secured to said cab and spaced therefrom to form a recess laterally around the sides and over the top of the cab, a collapsible cover, slidable into and out of said recess, means for securing one end of said cover to said casing at the inner end of said recess, and means for securing the other end of said cover when extended to the end of truck body.

5. The combination with a truck body having a driver's cab, of a cover extensible from said cab to the rear end of the truck body, and a casing for said cover arranged over said cab to form a recess with and over the cab to receive and enclose said cover when collapsed.

6. A collapsible cover attachment for a truck having a driver's cab, comprising an inverted U-shaped casing having end flanges extending inwardly to fit said cab, a pair of guide rods fixed at one end to each of the vertical flanges of said casing, a plate fixed adjustably to each pair of rails at their other ends, and a collapsible cover having one end fixed to the end flanges of said casing and extensible from a collapsed position in said casing to an extended position against said plates.

In testimony whereof I affix my signature.

ARTHUR GROVER SCHLICHER.